Dec. 10, 1963       S. S. KUFROVICH       3,113,347
SAFETY PANEL LAMINATING APPARATUS
Filed Sept. 12, 1962                      4 Sheets-Sheet 1

Stephen S. Kufrovich
INVENTOR.

BY
ATTORNEY

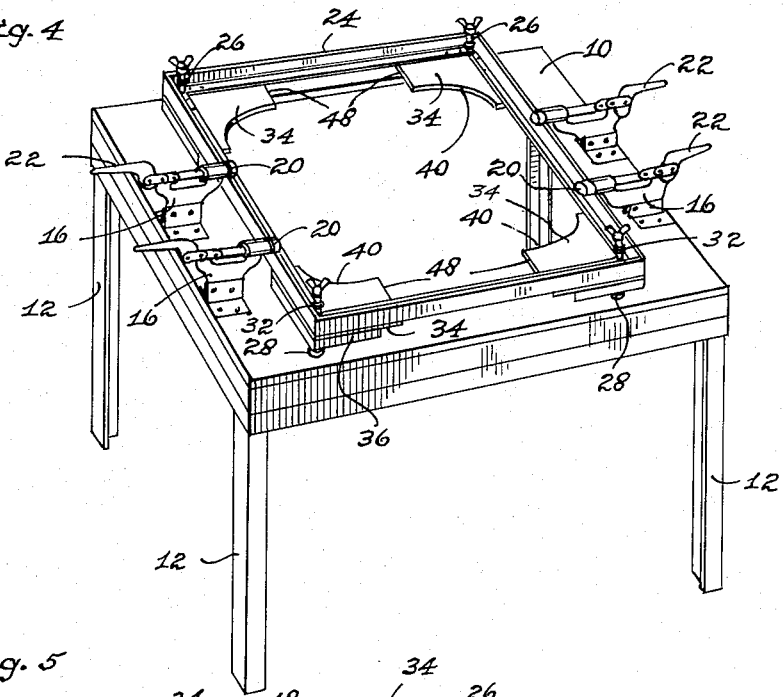
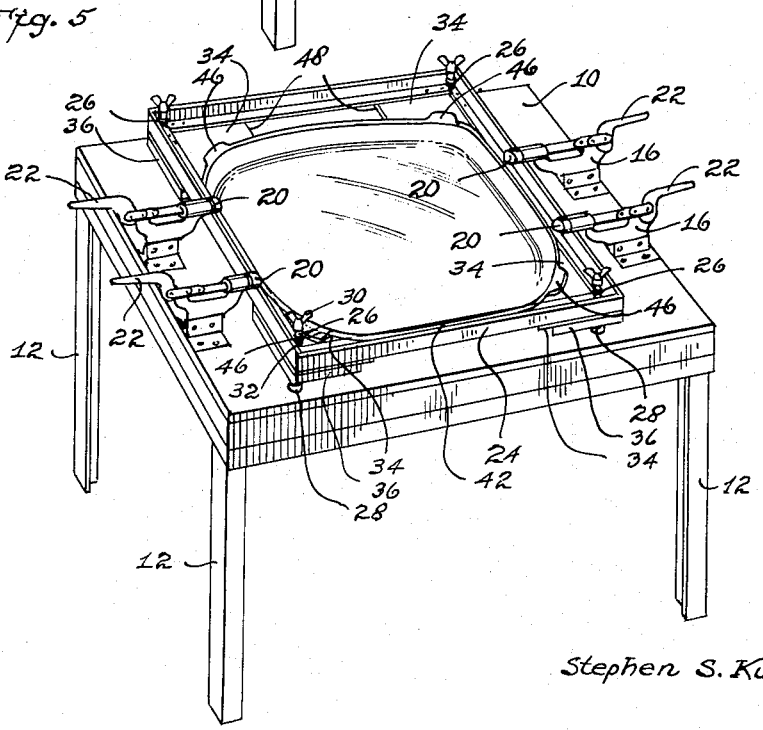

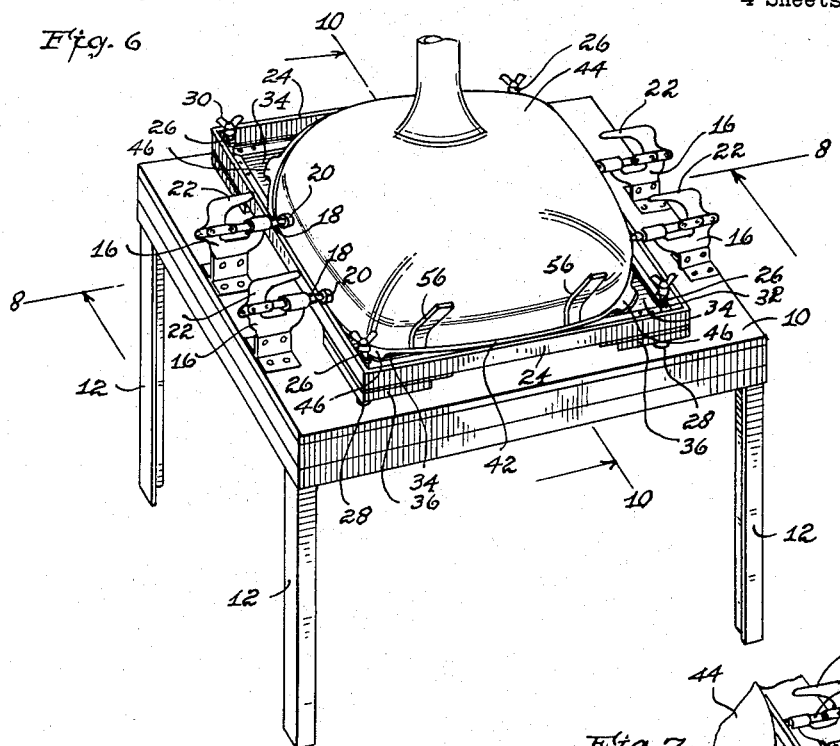
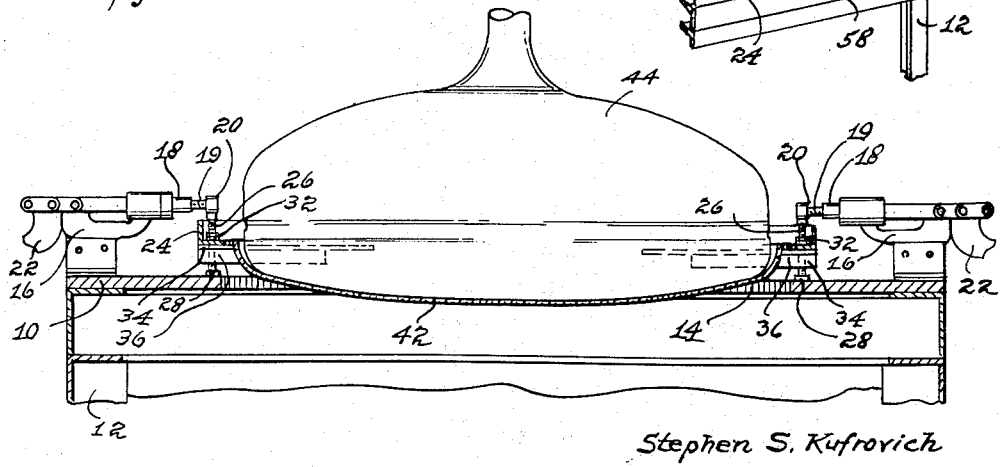

Dec. 10, 1963 S. S. KUFROVICH 3,113,347
SAFETY PANEL LAMINATING APPARATUS
Filed Sept. 12, 1962 4 Sheets-Sheet 4
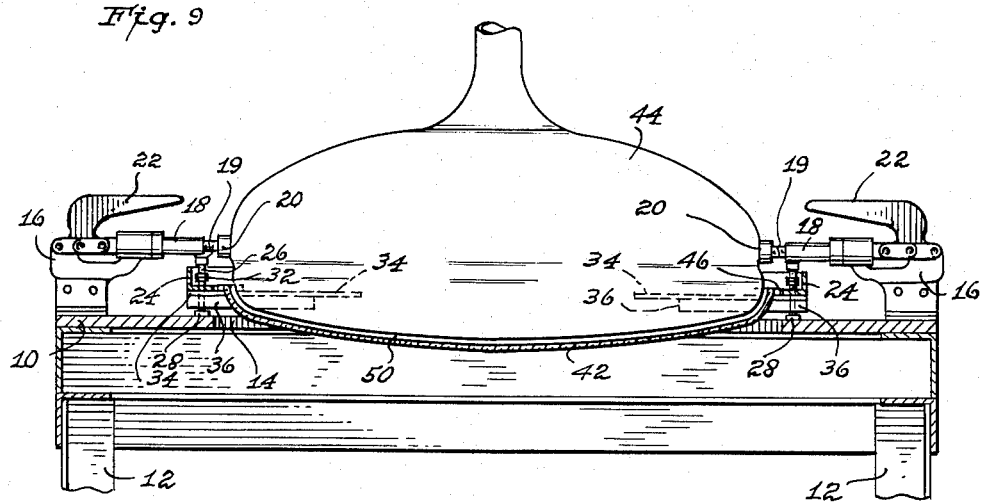
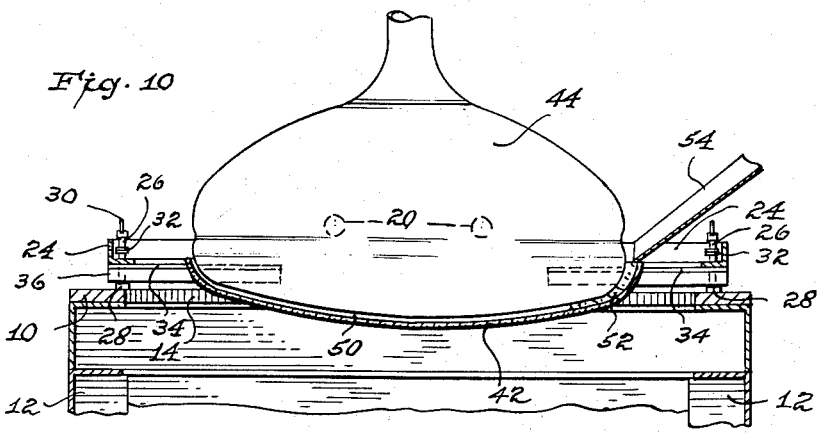
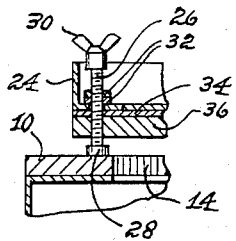
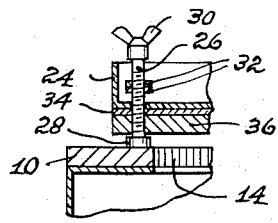
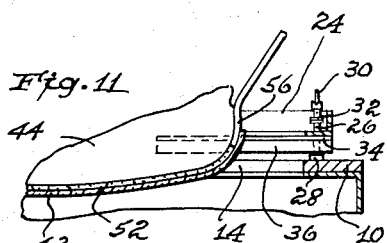
Stephen S. Kufrovich
INVENTOR.
BY J. W. Wells
ATTORNEY United States Patent Office 3,113,347
Patented Dec. 10, 1963

3,113,347
SAFETY PANEL LAMINATING APPARATUS
Stephen S. Kufrovich, 70 Fruit Tree Road, Levittown, Pa.
Filed Sept. 12, 1962, Ser. No. 223,046
6 Claims. (Cl. 18—36)

This invention relates to apparatus for use in laminating safety panels to television tubes, in which a liquid resin-epoxy mixture is poured into a space formed between the convex face of a television tube and a concave glass plate or panel and allowed to harden into a transparent resilient cushion for protection of viewers in the event of implosion of the television tubes, and also bonding the panel to the tube.

Elaborate and expensive apparatus for the purpose mentioned has been developed for use in large factories engaged in the production of large numbers of television tubes, but, as far as I am aware, no inexepnsive apparatus for the purpose mentioned suitable for small factories, shops and dealers engaged in reconditioning used television tubes on a relatively small scale, which requires the delamination of tubes and safety panels, then cleaning and relaminating them, has heretofore been developed.

Therefore, one of the principal objects of the present invention is to provide simple and inexpensive, but efficient, apparatus for the lamination of safety panels to television tubes. With such equipment, used television tubes can be reconditioned and relaminated with safety panels, thereby often salvaging both tubes and safety panels which otherwise would be lost.

In general, my improved laminating apparatus includes a rectangular table having therein a large central opening and a rigid rectangular frame slidably mounted on the table in surrounding relation with the opening and having rigidly attached nonmetallic plates at its corners in horizontal coplanar relation and having curved inner edges conforming to the perimetrical contour of the corners of a television safety panel, which is of generally rectangular form, but with slightly convex sides and rounded corners. Additionally the apparatus includes supporting means at the corners of the frame for raising the safety panel, together with the tube seated therein and then lowering the frame, together, with the panel only, a predetermined distance to form a space of the correct width into which the resin-epoxy mixture is poured to form the transparent cushion between the tube and panel. Clamping devices rigidly attached to the table are employed to fixedly clamp the television tube in its raised position, so that the safety panel can be lowered to form the space for the liquid mixture.

A further object of the invention is to provide nonmetallic panel supporting plates of the character mentioned of such formation and arrangement on the slidable frame as to leave ample hand space between the frame and panel to facilitate the manual placement of the panel and tube on the supporting plates and the subsequent removal of the laminated panel and tube from the plates after completion of the operation.

Further objects and advantages of my improved apparatus will be apparent or pointed out in the following specification in which reference is had to the accompanying drawings, and in which FIG. 1 is a perspective view showing one form of table for supporting the rectangular frame which, in turn, supports the television tube and safety panel during the laminating operation;

FIG. 4 is a perspective view showing the table and frame in assembled relation;

FIG. 5 is a perspective view similar to FIG. 4 and showing a television safety panel supported in the frame;

FIG. 6 is a perspective view similar to FIG. 5 and showing a television tube seated in the safety panel;

FIG. 7 is a perspective view of one corner of the assembly shown in FIG. 6, but showing a modified form of means for raising and lowering of the frame supporting the television tube and safety panel.

FIG. 8 is a section taken on the line 8—8 of FIG. 6, and showing the television tube when first seated in the safety panel; and with the tube clamping devices open;

FIG. 9 is a section similar to FIG. 8, but showing the television tube clamped in its raised position and the safety panel in its lowered position to form a predetermined space therebetween;

FIG. 10 is a section taken on the line 10—10 of FIG. 6 and showing the manner of pouring the liquid bonding mixture into the space between the television tube and safety panel;

FIG. 11 is a detail sectional view similar to FIG. 10 and showing the use of spacers (also shown in FIG. 6) after the pouring operation, to effect a uniform thickness in the layer of bonding material;

FIG. 12 is an enlarged detail sectional view showing the rectangular frame in its raised position; and FIG. 13 is a similar view showing the frame in its lowered position.

Figure 1:
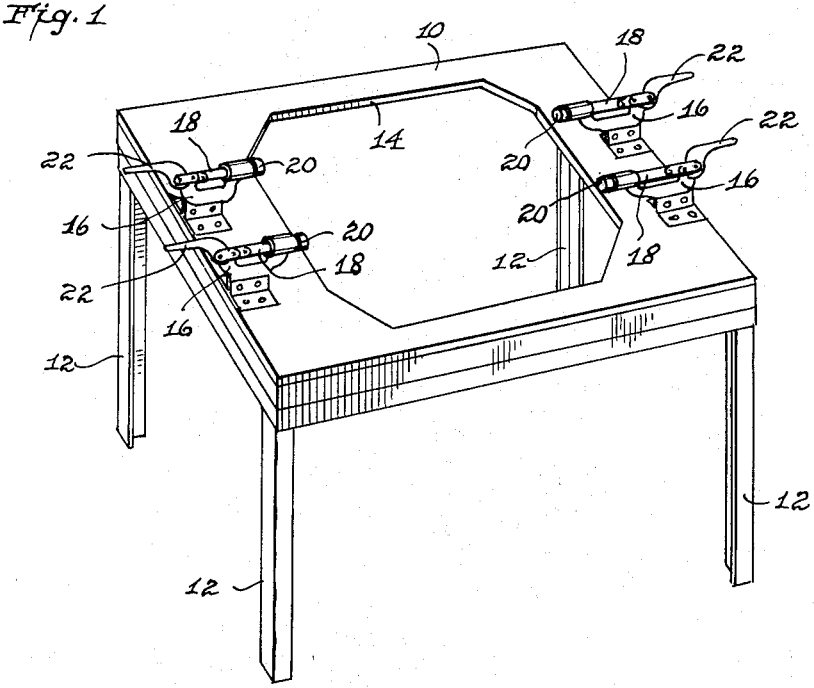
Figure 2:
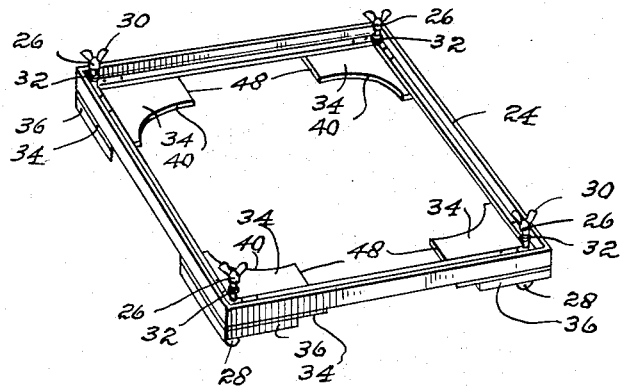
FIG. 2 is a perspective view of one form of rectangular frame referred to above.

Referring to the drawing in which like numerals designate like parts in the several views, 10 is a rectangular horizontal table supported by legs 12 and having a rigid top of metal or other suitable material and also having a large central opening 14 which may be of octagonal or other oblong formation. Rigidly attached to the table on two opposite sides of the opening 14 are pairs of clamping devices 16 having horizontally movable plungers 18 provided at their ends with axially adjustable screwthreaded stems 19 carrying resilient bumpers 20 at their free ends, and also having lever operating handles 22.

Figure 3:
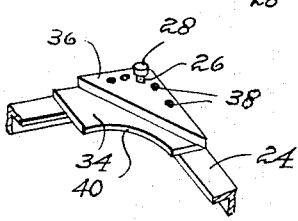
FIG. 3 is a fragmentary perspective view showing the bottom of one corner of the frame shown in FIG. 2.

A rectangular metal frame 24, which may be of angle metal or other suitable rigid construction, of a size to surround the opening 14 has vertically threaded therein at its corners screws 26 having at their lower ends swiveled opening, and provided at their upper ends with wings 30 or other suitable means for rotating them to raise or lower the frame in relation to the top of the table. These screws may be provided with pairs of adjustable locking nuts 32 for limiting the upward movement of the frame 24 and thereby ensuring that the frame will be raised to a level plane. The frame 24 is provided with nonmetallic plates 34 rigidly attached to its bottom corner surfaces in horizontal coplanar relation, these plates being clamped to the frame by means of metal gussets 36 (shown more clearly in FIG. 3) and headed screws 38 or other suitable means, the screws 26 being threaded through the gussets 36 and the nonmetallic plates 34.

The plates 34 have inwardly projecting curved edges 40 conforming to the perimetrical contour of the corners of a conventional glass safety panel 42 for a television tube 44, the safety panel being of generally rectangular contour in plan except with slightly convex sides and rounded corners, and is provided at its corners with integral, laterally projecting lugs 46. The safety panel referred to is also of concave formation corresponding to the convex formation of the face end of the television tube 44.

The nonmetallic plates 34 are wider on two opposite sides of the frame 24, than on the other two sides, as shown at 48, to provide ample hand space between the frame 24 and a safety panel and tube when being manually placed on the plates 34 or removed therefrom.

In the operation of laminating a safety panel 42 to a television tube 44 the frame 24 is placed over the opening 14 in the table 10. The panel and tube are then heated to a specified temperature. The panel is then placed within the curved edges 40 of the plates 34 with the lugs 46 supporting the panel on the plates, as shown in FIG. 5. The next step is to rotate the corner screws 26 and raise the frame 24 until stopped by the nuts 32, as shown in FIG. 8. The tube 44 is then nested in the panel, as also shown in FIG. 8, and the clamping devices 16 are operated to clamp the tube between opposed bumpers 20, and the four corner screws 26 are then rotated in reverse to lower the frame, together with only the panel, a predetermined distance, which can be controlled by the number of turns of the screws 26, or by making the swiveled feet 28 of a length equal to the predetermined width of the space 50, and thereby forming a space 50 between the tube 44 and the panel 42 equal to the predetermined width of the layer of bonding material. A predetermined amount of a liquid resin-epoxy 52 is poured into the space 50 by means of a metal chute 54 or other suitable means, as shown in FIG. 10. This mixture subsequently hardens into a layer of transparent resilient material which serves as the bonding element as well as a cushion against implosion of the television tube. As also shown in FIG. 10, the frame can be slidably shifted on the table, together with the panel 42 to widen the space 50 at one side, if desired, to facilitate the pouring operation. Then, when a sufficient quantity of the mixture has been poured, the panel can be shifted back against spacers 56 to equalize the width of the space, as shown in FIG. 11.

As shown in FIG. 7, other means may be employed for raising and lowering the frame 24, such, for example, as a cam 58 pivotally mounted on the frame and provided with a lever handle 60.

From the foregoing description it will be seen that I have provided simple, economical and efficient apparatus for the lamination of television tubes and safety panels therefor within the financial means of small factories, shops and dealers.

Obviously, various changes and modifications may be made in my improved apparatus without departing from the spirit or scope of my invention. Therefore, it should be understood that the embodiment of my invention shown and described are intended to be illustrative, only, and restricted only to the appended claims.

I claim:

1. Laminating apparatus for use in bonding a generally rectangular concave glass safety panel to a corresponding convex face of a television tube, said panel having rounded corners and integral laterally projecting corner lugs; said apparatus comprising, in combination, a horizontal table having a large central opening, and a rigid rectangular frame having operative means at its corners for supporting said frame on said table in slidable relation therewith outside the edge of said opening and for alternately raising and lowering said frame a predetermined distance in relation to said table, said frame also having rigidly attached thereto at its respective corners nonmetallic plates in horizontal coplanar relation and having inwardly projecting curved edges conforming to the perimetrical contour of the corner portions of said safety panel for close interfitting reception therein of said safety panel, with said lugs supporting said panel on said nonmetallic plates; pairs of clamping devices rigidly attached to said table on opposite sides of the large opening therein for clamping contact above said frame with a television tube seated in said safety panel; the primary function of the supporting means at the corners of said frame being first to raise said frame to a predetermined height above said table and then, after a safety panel has been seated on said nonmetallic plates and a television tube nested therein, and said tube has been clamped in fixed position by said clamping devices, then to lower said frame, together with said safety panel, only, a predetermined distance to provide a correct space between said tube and panel for the reception of a liquid bonding mixture poured therein.

2. Laminating apparatus as in claim 1 in which the clamping devices have horizontal movable plungers provided with resilient axially adjustable bumpers for clamping contact with opposite sides of the television tube.

3. Laminating apparatus as in claim 1 in which the nonmetallic plates are wider on two opposed sides of the frame than on the other two sides thereof to leave spaces between the frame and a television tube and safety panel to afford hand room for grasping said tube and panel in placing them on the nonmetallic plates and removing them therefrom.

4. Laminating apparatus for use in bonding a generally rectangular concave glass safety panel to a corresponding convex face of a television tube, said panel having rounded corners and integral laterally projecting corner lugs; said apparatus comprising, in combination, a horizontal table having a large central opening, and a rigid rectangular frame having threaded therein at its corners vertical screws supporting said frame on said table in slidable relation therewith outside the edge of said opening, said frame also having rigidly attached to its bottom surface at its respective corners nonmetallic plates in horizontal coplanar relation and having inwardly projecting curved edges conforming to the perimetrical contour of the corner portions of said safety panel for close interfitting reception therein of said safety panel, with said lugs supporting said panel on said nonmetallic plates; pairs of clamping devices rigidly attached to said table on opposite sides of the large opening therein for clamping contact above said frame with a televsion tube seated in said safety panel, the primary function of the corner screws in said frame being first to raise said frame to a predetermined height above said table and then, after a safety panel has been seated on said nonmetallic frame and a television tube nested therein, and said tube has been clamped in fixed position by said clamping devices, to lower said frame, together with said safety panel, only, a predetermined distance to provide a correct space between said tube and panel for the reception of a liquid bonding mixture poured therein.

5. Laminating apparatus as in claim 4 in which the nonmetallic plates are fastened to the bottom surface of the frame by means of corner gussets rigidly attached to said frame below said nonmetallic plates and in which the supporting screws at the corners of the frame are threaded through said gussets and nonmetallic plates.

6. Laminating apparatus as in claim 4 in which the bottom ends of the screws at the corners of the frame are provided with swiveled contact feet in slidable relation with said table.

References Cited in the file of this patent
UNITED STATES PATENTS

| | | |
|---|---|---|
| 2,781,554 | Robinson | Feb. 19, 1957 |
| 3,007,833 | Jackman | Nov. 7, 1961 |
| 3,075,870 | Hedler et al. | Jan. 29, 1963 |